(12) United States Patent
Nowak

(10) Patent No.: US 10,603,758 B1
(45) Date of Patent: Mar. 31, 2020

(54) METHOD, APPARATUS AND COMPUTER-READABLE MEDIUM FOR DEBURRING

(71) Applicant: Moog Inc., East Aurora, NY (US)

(72) Inventor: Gerard Nowak, Holland, NY (US)

(73) Assignee: Moog Inc., East Aurora, NY (US)

(*) Notice: Subject to any disclaimer, the term of this patent is extended or adjusted under 35 U.S.C. 154(b) by 82 days.

(21) Appl. No.: 15/836,140

(22) Filed: Dec. 8, 2017

Related U.S. Application Data

(60) Provisional application No. 62/431,626, filed on Dec. 8, 2016.

(51) Int. Cl.
*B24B 9/00* (2006.01)
*B23C 3/12* (2006.01)
*B24B 27/00* (2006.01)
*B24B 5/04* (2006.01)

(52) U.S. Cl.
CPC .................. *B24B 9/00* (2013.01); *B23C 3/12* (2013.01); *B24B 27/0023* (2013.01); *B24B 5/04* (2013.01)

(58) Field of Classification Search
CPC ......... B24B 9/00; B24B 3/12; B24B 27/0023; B24B 5/04
USPC .................................... 451/461, 49, 555, 558
See application file for complete search history.

(56) References Cited

U.S. PATENT DOCUMENTS

| | | | | |
|---|---|---|---|---|
| 53,645 A * | 4/1866 | McRoberts | ............. | B29C 43/00 425/408 |
| 137,763 A * | 4/1873 | Daniels | ................... | B24D 15/02 451/557 |
| 151,323 A * | 5/1874 | Tasker | ...................... | B21D 5/12 72/113 |
| 194,417 A * | 8/1877 | Davis | .................... | B26B 29/063 83/762 |
| 211,107 A * | 1/1879 | Pollock | ................ | B23Q 35/103 409/105 |
| 211,261 A * | 1/1879 | Read et al. | ............. | A62C 37/10 169/55 |
| 211,262 A * | 1/1879 | Sawyer | ..................... | H01K 3/02 445/48 |
| 219,726 A * | 9/1879 | Hoover | ................... | F04B 31/00 417/328 |
| 241,504 A * | 5/1881 | Morton | ..................... | A01C 7/02 111/97 |
| 260,356 A * | 7/1882 | Barry | ...................... | D21F 1/365 474/105 |
| 276,886 A * | 5/1883 | Rudolph | ................... | E06B 3/50 49/172 |
| 277,166 A * | 5/1883 | Shedlock | ................ | F21V 17/00 362/363 |

(Continued)

*Primary Examiner* — George B Nguyen

(74) *Attorney, Agent, or Firm* — Harter, Secrest & Emery LLP

(57) ABSTRACT

Presented is a method, apparatus, and computer-readable medium for deburring. An apparatus includes a body, a first abrasive surface coupled to the body, and a second surface coupled to the body, the second surface positioned relative to the first abrasive surface, wherein the second surface is positioned between 1° and 90° relative to the first abrasive surface. The apparatus further includes a third abrasive surface coupled to the body, the third abrasive surface positioned perpendicular to the first abrasive surface and the second surface along a terminal edge of the first abrasive surface and a terminal edge of the second surface.

22 Claims, 7 Drawing Sheets

(56) References Cited

U.S. PATENT DOCUMENTS

| | | | | |
|---|---|---|---|---|
| 280,380 A * | 7/1883 | Kane et al. | | A41G 1/02 425/374 |
| 287,222 A * | 10/1883 | Brinkerhoff et al. | | E04H 17/063 256/1 |
| 555,819 A * | 3/1896 | Johnston | | B24D 15/00 451/461 |
| 572,190 A * | 12/1896 | Brinkman | | B24D 15/081 76/86 |
| 612,912 A * | 10/1898 | Poindexter | | B24D 15/08 76/88 |
| 833,499 A * | 10/1906 | Baries | | B24D 15/08 76/88 |
| 1,059,491 A * | 4/1913 | Schwartz | | B24D 15/081 451/45 |
| 1,324,512 A * | 12/1919 | Maurer | | B24D 15/08 451/555 |
| 1,352,599 A | 9/1920 | Hartog | | |
| 1,438,052 A * | 12/1922 | Nichols | | B24D 15/08 76/88 |
| 1,540,078 A * | 6/1925 | Long | | B24D 15/085 451/321 |
| 1,608,841 A * | 11/1926 | De Canio | | B24D 15/085 451/164 |
| 1,803,364 A * | 5/1931 | Stephens | | B24D 15/085 451/321 |
| 2,047,439 A * | 7/1936 | Skevington | | B24D 15/063 76/88 |
| 2,109,857 A | 3/1938 | Berkman | | |
| 2,116,582 A * | 5/1938 | Muelberger, Jr. | | B24D 15/088 451/555 |
| 2,160,979 A * | 6/1939 | Moeller | | B24D 15/08 451/555 |
| 2,238,340 A * | 4/1941 | Poe | | B43L 23/006 451/461 |
| 2,471,236 A | 5/1949 | Parker | | |
| 2,473,702 A * | 6/1949 | Carlin | | B24D 15/082 451/555 |
| 2,559,273 A * | 7/1951 | Brinkley | | B24D 15/08 451/555 |
| 2,649,663 A | 8/1953 | Sunnen | | |
| 2,743,561 A * | 5/1956 | Franks | | B24D 15/081 451/555 |
| 2,798,344 A * | 7/1957 | Hertel | | B24D 15/10 30/331 |
| 3,052,068 A * | 9/1962 | Burgess | | B24B 3/54 451/124 |
| 3,623,280 A * | 11/1971 | Chesnut | | B24D 15/06 451/502 |
| 3,733,933 A * | 5/1973 | Longbrake | | B23D 67/12 76/88 |
| 3,797,334 A * | 3/1974 | Sinclair | | B23D 67/10 76/88 |
| 3,800,632 A * | 4/1974 | Juranitch | | B24D 15/06 76/82 |
| 3,819,170 A * | 6/1974 | Longbrake | | B23D 67/12 269/3 |
| 4,078,455 A * | 3/1978 | Brody | | B23D 71/04 451/555 |
| 4,228,703 A * | 10/1980 | Moss | | B24D 15/06 76/82.2 |
| 4,494,340 A * | 1/1985 | Carter | | B24D 15/081 451/555 |
| 4,530,188 A * | 7/1985 | Graves | | B24D 15/081 451/461 |
| 4,696,129 A * | 9/1987 | Roberts | | B24D 15/06 451/45 |
| 4,747,235 A * | 5/1988 | Priebe | | B24D 15/06 451/361 |
| 4,835,910 A * | 6/1989 | Roberts | | B24D 15/06 451/45 |
| 5,157,879 A | 10/1992 | Fletcher | | |
| 5,636,556 A * | 6/1997 | Friedlander | | B24D 15/06 76/88 |
| 5,749,774 A | 5/1998 | Foster | | |
| 6,074,293 A * | 6/2000 | Bleier | | B24D 15/06 451/558 |
| 6,080,053 A | 6/2000 | Marvin et al. | | |
| 6,106,370 A | 8/2000 | Carter | | |
| 6,227,958 B1 * | 5/2001 | Neuberg | | B24D 15/08 30/269 |
| 6,255,850 B1 | 7/2001 | Turner | | |
| 6,308,548 B1 | 10/2001 | Schwochert et al. | | |
| D550,532 S * | 9/2007 | Radocy | | D8/91 |
| 7,264,540 B1 * | 9/2007 | Brantley | | B24B 3/54 451/194 |
| 8,167,688 B1 * | 5/2012 | Adler | | B24D 15/081 451/349 |
| 8,210,910 B2 * | 7/2012 | McLain | | B24D 15/02 451/461 |
| 8,495,782 B2 | 7/2013 | Franke et al. | | |
| 9,091,820 B2 | 7/2015 | Stephens et al. | | |
| D772,674 S * | 11/2016 | Johnson | | D8/91 |
| 10,220,489 B2 * | 3/2019 | Rampling | | B24D 15/06 |

* cited by examiner

1202: (a) placing an item in contact with a first abrasive surface, a second surface positioned relative to the first abrasive surface, wherein the second surface is positioned between 1° and 90° relative to the first abrasive surface, and a third abrasive surface, the third abrasive surface positioned perpendicular to the first abrasive surface and the second surface along a terminal edge of the first abrasive surface and a terminal edge of the second surface; and (b) rotating the item relative to the first abrasive surface, the second surface, and the third abrasive surface, and wherein the first abrasive surface, the second surface, and the third abrasive surface are coupled to a body.

1204: wherein the first abrasive surface and the second surface form a "V" shape.

1206: wherein the first abrasive surface, and the third abrasive surface are operable to remove burrs from an edge of the item upon rotation of the item maintained in contact with the first abrasive surface, and the third abrasive surface.

1208: wherein the second surface is moveable relative to the first abrasive surface between 1° and 90°.

1210: wherein the first abrasive surface, the second surface, and the third abrasive surface are operable to be removeably coupled to the body.

1212: wherein a portion of the first abrasive surface comprises a slide guide and a removeable abrasive slide, the removeable abrasive slide operable to removeably attached to the first abrasive surface by the slide guide.

1214: wherein a portion of the first abrasive surface comprises a slide guide and a removeable abrasive slide, the removeable abrasive slide operable to removeably attached to the first abrasive surface by the slide guide.

METHOD, APPARATUS AND COMPUTER-READABLE MEDIUM FOR DEBURRING

FIELD OF THE INVENTION

Embodiments of the present disclosure relates to a method, apparatus and computer-readable medium for deburring. Embodiments of the present disclosure relate more particularly to a method, apparatus and computer-readable medium for deburring manufactured articles.

DESCRIPTION OF RELATED ART

During manufacturing including machining operations, an item or article of manufacture will often have a burr along an edge of the item. A burr is a raised edge or small piece of the item's material that remains attached to the item after it is manufactured. A burr can be created through machining operations, such as grinding, drilling, milling, engraving or turning. Deburring or the removal of burrs from an item accounts for a large portion of the costs associated manufacturing.

BRIEF SUMMARY OF THE INVENTION

In view of the foregoing, it is an object of the present invention to provide a method, apparatus and computer-readable medium for deburring.

A first exemplary embodiment of the present disclosure provides an apparatus for deburring. The apparatus includes a body, a first abrasive surface coupled to the body, and a second surface coupled to the body, the second surface positioned relative to the first abrasive surface, wherein the second surface is positioned between 1° and 90° relative to the first abrasive surface. The apparatus further includes a third abrasive surface coupled to the body, the third abrasive surface positioned perpendicular to the first abrasive surface and the second surface along a terminal edge of the first abrasive surface and a terminal edge of the second surface.

A second exemplary embodiment of the present disclosure provides a method of manufacture. The method includes providing a body, providing a first abrasive surface coupled to the body, and providing a second surface coupled to the body, the second surface positioned relative to the first abrasive surface, wherein the second surface is positioned between 1° and 90° relative to the first abrasive surface. The method further includes providing a third abrasive surface coupled to the body, the third abrasive surface positioned perpendicular to the first abrasive surface and the second surface along a terminal edge of the first abrasive surface and a terminal edge of the second surface.

A third exemplary embodiment of the present disclosure provides a method of deburring. The method includes placing an item in contact with a first abrasive surface, a second surface positioned relative to the first abrasive surface, wherein the second surface is positioned between 1° and 90° relative to the first abrasive surface, and a third abrasive surface, the third abrasive surface positioned perpendicular to the first abrasive surface and the second surface along a terminal edge of the first abrasive surface and a terminal edge of the second surface. The method further includes rotating the item relative to the first abrasive surface, the second surface, and the third abrasive surface, and wherein the first abrasive surface, the second surface, and the third abrasive surface are coupled to a body.

A fourth exemplary embodiment of the present disclosure provides a non-transitory computer-readable medium tangibly comprising computer program instructions, which, when executed by a processor, causes the processor to at least place an item in contact with a first abrasive surface, a second surface positioned relative to the first abrasive surface, wherein the second surface is positioned between 1° and 90° relative to the first abrasive surface, and a third abrasive surface, the third abrasive surface positioned perpendicular to the first abrasive surface and the second surface along a terminal edge of the first abrasive surface and a terminal edge of the second surface, and rotate the item relative to the first abrasive surface, the second surface, and the third abrasive surface, and wherein the first abrasive surface, the second surface, and the third abrasive surface are coupled to a body The following will describe embodiments of the present disclosure, but it should be appreciated that the present disclosure is not limited to the described embodiments and various modifications of the invention are possible without depart from the basic principle. The scope of the present disclosure is therefore to be determined solely by the appended claims.

BRIEF DESCRIPTION OF THE SEVERAL VIEWS OF THE DRAWING(S)

FIG. 1 is an exemplary item having edge with a burr and an exemplary item having an edge without a burr.

FIG. 2 presents examples of an item with burrs and examples of different deburring results.

FIG. 3 presents a top view of an exemplary deburring device suitable for use in practicing exemplary embodiments of this disclosure.

FIG. 4 is a top and close-up view of an exemplary deburring device in use suitable for practicing exemplary embodiments of this disclosure.

FIG. 5 a side view of deburring in accordance with use of exemplary embodiments of the present disclosure.

FIG. 12 is a logic flow diagram in accordance with a method, apparatus and computer-readable medium for performing exemplary embodiments of this disclosure.

DETAILED DESCRIPTION OF THE INVENTION

The null edges of machined cylindrical parts typically contain rounding, excess material and/or burrs due to standard machining processes. Embodiments of the present disclosure provide an apparatus, method and computer-readable medium for removing a burr from an edge of an item, also known as deburring. Embodiments of the present disclosure provide a device that is operable to repeatedly and reliably remove excess material and/or burrs from the edges of cylindrical parts for the purpose of creating an edge that is sharp and free from burrs. More particularly, embodiments of the present disclosure provide an apparatus, method and computer-readable medium for improved deburring of a cylindrically shaped machined article. Embodiments still further provide an apparatus having three abrasive surfaces coupled to a body such that an item in physical contact with the three abrasive surfaces can be rotated within the apparatus thereby producing a sharp burr free edge. Embodiments are further directed toward a new burr removal tool that simultaneously establishes abrasive alignment on two perpendicular surfaces while reducing reliance on operator dexterity, thus allowing for a cost effective manufacturing method for the removal of burrs on the null edges of cylindrical machined parts.

Embodiments provide a device having a body shaped such that a number of abrasive elements are simultaneously in contact with multiple part surfaces. For instance, embodiments provide two abrasives elements forming a V-shape to align the device with a cylindrical surface of the part, and a third abrasive element positioned perpendicular to axis of the V-shaped elements in order to contact the end face of the cylindrical surface.

Figure 1:
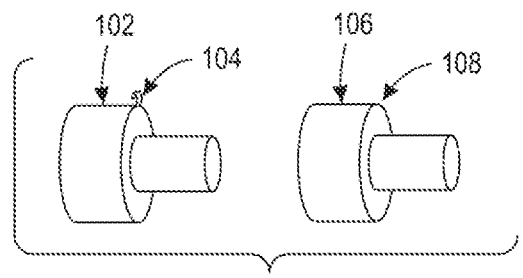

Referring to FIG. 1, shown is cylindrical object 102 having a burr 104 along its machined edge, and a cylindrical object 106 after being deburred. As is evident, cylindrical object 106 has a sharp, burr free edge 108. Typical manufacturing methods for the removal of these burrs are labor intensive, which results part variation, scrap material, and rely on the skilful dexterity of each individual user to achieve high part or object quality.

Figure 2:
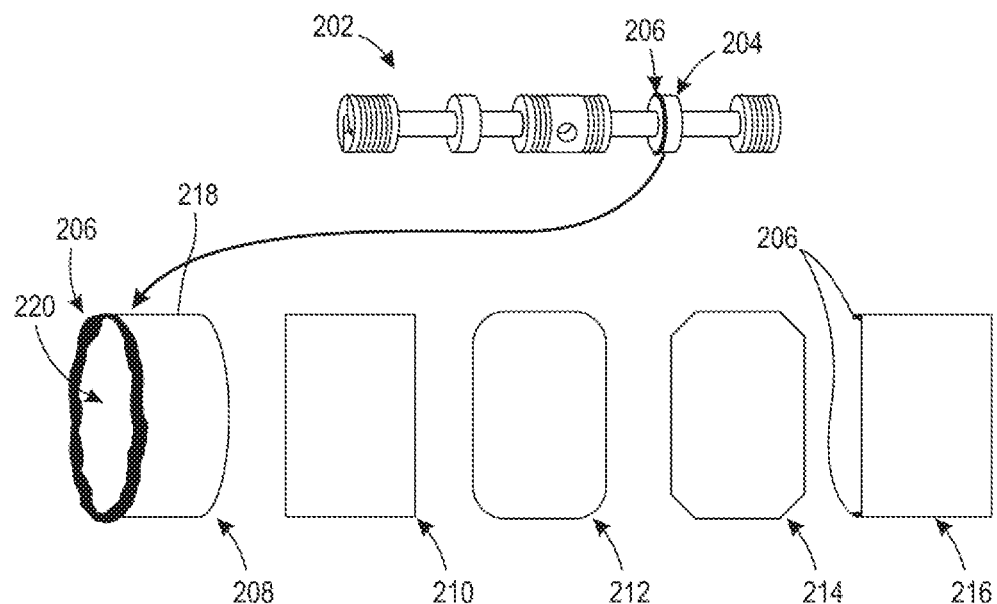

Examples of various deburring results are shown in FIG. 2. Shown in FIG. 2 is machined spool 202 having cylindrical portion 204 with burrs 206. Cylindrical portion 204 includes a curved outward face 218 and a radial face 220. Below machined item 202 at 208-216 are close-up views of cylindrical portion 204. 210 represents an ideal result of deburring having perfectly sharp edges desired for best spool operation. 212 represents an example of improper deburring wherein cylindrical portion 204 has rounded edges thereby negatively affecting spool 202 performance. 214 represents another example of improper deburring wherein cylindrical portion 204 has chamfered or angled edges again negatively affecting spool 202 performance. 216 represents an example of improper deburring wherein cylindrical portion 204 is under deburred and a portion of burrs 206 remains on an edge of cylindrical portion 204.

Figure 3:
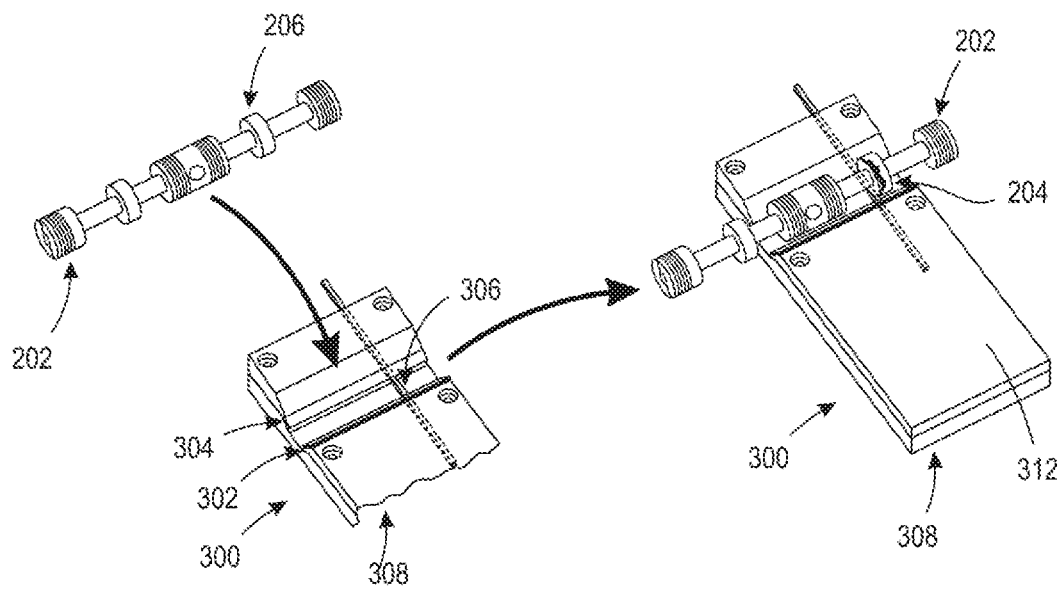
Figure 4:
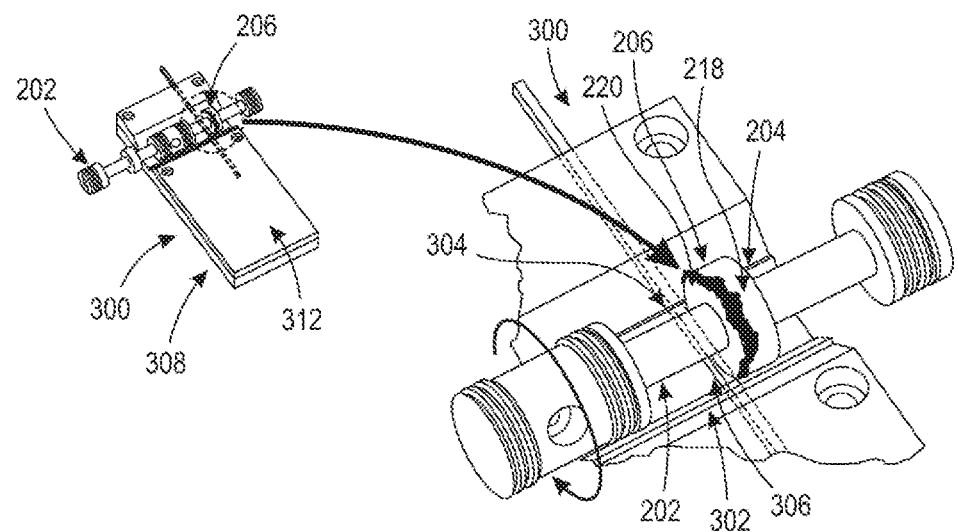

Reference is now made to FIG. 3 and FIG. 4, which depict an exemplary burr removal tool 300 operable for deburring a cylindrical object, such as spool 202. Burr removal tool 300 includes body 308 that positions a number of abrasive elements 302, 304, 306 for simultaneously contacting the perpendicular edges of a machined cylindrical part (e.g., spool 202 with burrs 206). The burr removal tool 300 has three abrasive elements 302, 304, 306 arranged in the configuration shown in FIG. 3 with two of the abrasive elements (302, 304) forming a V-shape relative to one another to align the burr removal tool 300 with the cylindrical portion 204 of spool 202. Abrasive elements 302 and 304 are depicted in FIG. 3 as rectangular shaped, but embodiments provide that abrasive elements 302 and 304 can be any shape provided that the outward facing curved portion of cylindrical portion 204 can be in physical contact with both abrasive elements 302, 304, and the radial portion of cylindrical portion 204 is simultaneously in physical contact with abrasive element 306. Abrasive element 306 is positioned perpendicular to the axis of the "V" portion such that the abrasive element 306 runs between and/or through both abrasive elements 302 and 304. Abrasive element 306 may contact an end face or radial portion 220 of the cylindrical portion 204 while the "V" portion (i.e., abrasive elements 302, 304) simultaneously contacts the curved outward face 218 of the cylindrical portion 204. The three abrasive elements 302, 304, 306 are supported by a body 308, which holds the abrasive elements 302, 304, 306 in place and allows the burr removal tool 300 to be positioned by a user for proper burr removal.

The combination of the three abrasive elements 302, 304, 306 and body 308 allows a user to simultaneously finish two adjoining surfaces of a cylindrical machined object to remove any burrs at the edge interface between the three abrasive elements 302, 304, 306 and the cylindrical machined object. In particular, embodiments of burr removal tool 300 allow a user to achieve a desirable edge geometry for an object having sharp edges (e.g., at a 90° angle) and free from burrs, while eliminating the time and dexterity previously required to achieve such an edge.

In practice, use of burr removal tool 300 begins with providing a cylindrical part (e.g., spool 202) having material fragments or burrs 206 clinging to a null edge. Next, the cylindrical part is placed within the tool such that the abrasive elements 302 and 304 (forming a V-shape) are in contact the curved outer face 218 of cylindrical portion 204 of spool 202, and such that the perpendicular abrasive element 306 is in contact with radial face 220 of cylindrical portion 204. Then, with reference to FIG. 4, a load is applied to spool 202 such that there is a small amount of pressure exerted in a downwards direction against abrasive elements 302, 304, and in a sideways direction against abrasive element 306. While maintaining the downward and sideways pressure, spool 202 is rotated against abrasive elements 302, 304, 306, such that burrs 206 located on either the curved outer face 218 or radial face 220 of the cylindrical part are simultaneously removed by abrasive elements 302, 304, 306.

Figure 5:
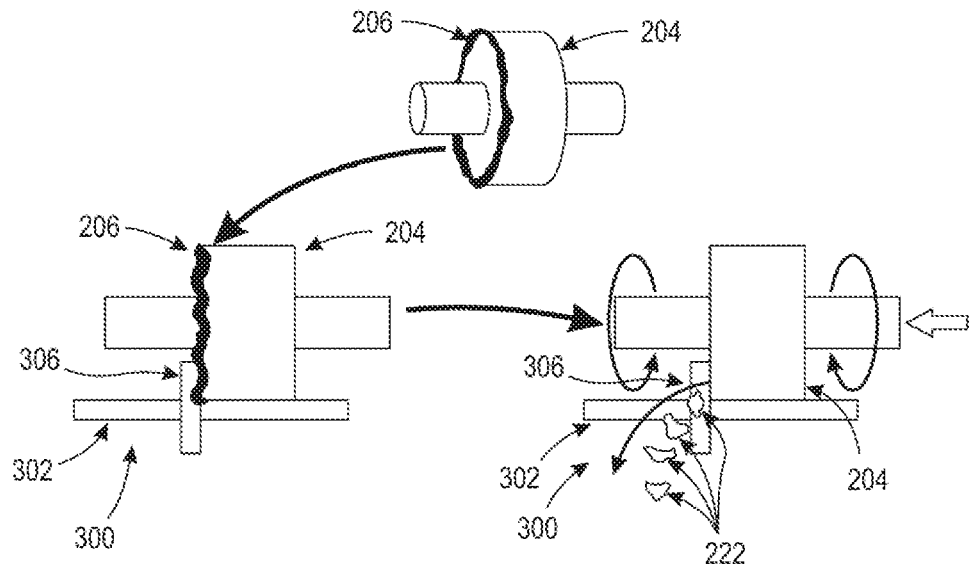

Referring to FIG. 5, shown are multiple cross-sectional views of burr removal tool 300 in operation on cylindrical portion 204. Shown in FIG. 5 is cylindrical portion 204 with burrs 206 clinging to the null edge of cylindrical portion 204. In operation, cylindrical portion 204 is placed in contact with abrasive elements 302, 304, and 306 simultaneous such that the null edge having burrs 206 is between and in contact with abrasive elements 302, 304, and 306. As shown in FIG. 5, burrs 206 are not flattened or bent back onto the surface of cylindrical portion 204 when cylindrical portion 204 is rotated against abrasive elements 302, 304, and 306. Rather, burrs 206 are removed from cylindrical portion 204 as burr fragments 222 thereby leaving a burr free edge on cylindrical portion 204.

Embodiments of the body 308 and abrasive elements 302, 304, 206 include many different configurations. For instance, abrasive elements 302, 304, 306 can be disposable having a limited number of uses, or they can be higher quality abrasive elements operable to be used numerous time. Embodiments further include that body 308 and abrasive elements 302, 304, 306 are configured such that each abrasive element 302, 304, 306 is removeably affixed to body 308. Each of the abrasive elements 302, 304, 306 can be removed and replaced with a new abrasive element. In one embodiment, abrasive elements 302 and 304 are removeably and slidably affixed to body 308 along a slide guide 310 (not shown) such that abrasive elements 302 and 304 can be slidably removed from body 308. Likewise, abrasive element 306 can be removeably and slidably affixed to body 308 within a slide guide 312 such that as the abrasiveness of the exposed section of abrasive element 306 wears down, abrasive element 306 can be slid along slide guide 312 thereby exposing a new abrasive portion of abrasive element 306 to be used for burr removal. In yet another embodiment, abrasive elements 302, 304 can be affixed to body 308 through an adhesive or glue (shown in FIG. 6).

Figure 6:
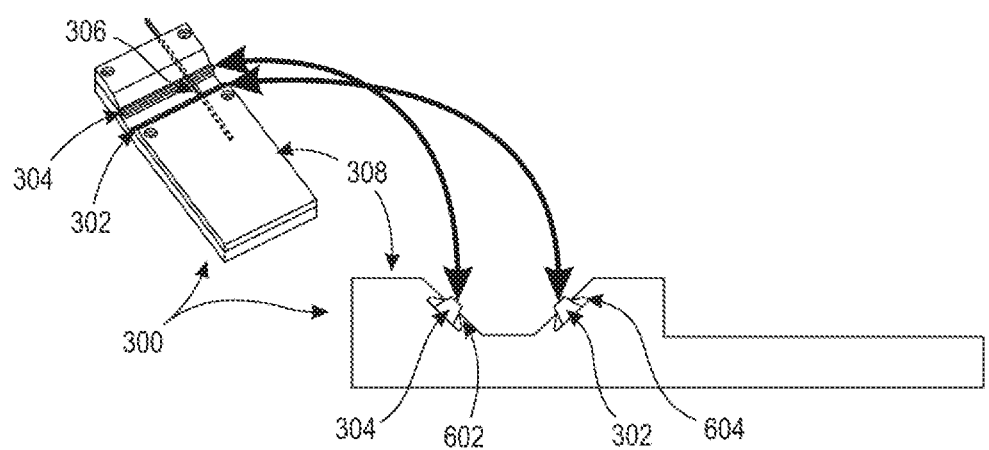
FIG. 6 is a top view and a side view of an exemplary deburring apparatus.

In the embodiment shown in FIG. 6, illustrated is an example of abrasive elements 302, 304 being removeably and replaceably affixed to body 308 through the use of spring clips 602, 604. In this embodiment, spring clips 602, 604 clasp or clip onto abrasive elements 302, 304, respectively. Spring clips 602, 604 impart frictional forces on abrasive elements 302, 304 thereby substantially maintaining the location of abrasive elements 302, 304 relative to body 308.

The size and dimensions of embodiments of the disclosed burr removal tool 300, along with each of its component parts, can be altered as necessary depending on the size of the machined cylindrical parts that require deburring. For instance, embodiments of burr removal tool 300 include different variations of height/width/length of each of the abrasive elements. Additionally, the angle between the two abrasive elements (302, 304) forming the "V" shape can be altered between 0° to 45° to 90° provided the height of the abrasive element 306 perpendicular to the axis of the "V" portion is sufficient to contact a radial face of a cylindrical machined part being deburred.

In yet another embodiment, only two abrasive elements are required. In this embodiment, the abrasive elements 302, 304 forming the V-shape are present, but abrasive element 306 is removed and replaced with a fixed bearing surface (i.e. not abrasive). The fixed bearing surface provides a planar surface operable to engage a radial face of a cylindrically machined part being deburred by abrasive elements 302, 304. However, the fixed bearing surface does not contribute directly to the burr removal process in an abrasive capacity.

Embodiments of burr removal tool 300 include body 308 having different configurations that suit unique geometries of an object that requires deburring. For instance, if the burr removal tool 300 is to be used manually by a user, the ergonomics of the body 308 can be tailored for optimal user comfort and performance. The handle 710 of the body 308 and the surface of the body 308 opposite the abrasive elements may be configured such that a user may easily grip and manipulate the burr removal tool 300. In other cases, the burr removal tool 300 may be used in automated deburring processes (e.g., with a CNC grinder or lathe), or it can be modified by any number of attachments such that it can operably interface with standard tool holders in individual machine geometry.

In further aspects, body 308 can include visual aids, markings, indents, and/or positive stops that would contact or direct correct placement of a feature of a cylindrical part on burr removal tool 300 to help to ensure proper use and alignment of the burr removal tool 300.

Figure 7:
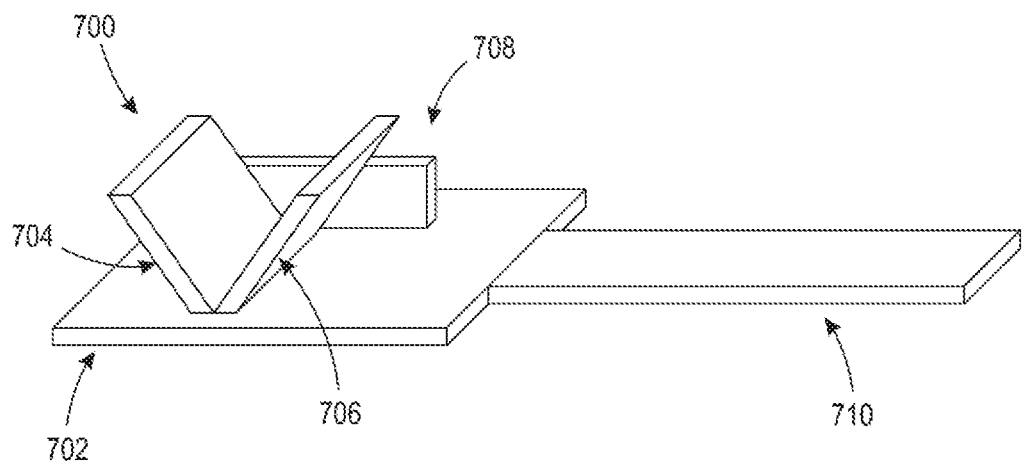
FIG. 7 is a perspective view of an exemplary deburring device suitable for use in practicing exemplary embodiments of this disclosure.

Referring to FIG. 7, shown is another embodiment of a burr removal tool. Shown is burr removal tool 700 having a body 702, first abrasive element 704, second abrasive element 706, third abrasive element 708, and handle 710. Similar to the burr removal tool 300 shown in FIGS. 3 and 4, the first abrasive element 704 and the second abrasive element 706 are affixed or removeably affixed to body 702 forming a V-shape. The third abrasive element 708 is affixed or removeably affixed to body 702 perpendicular to abrasive elements 704, 706 such that the third abrasive element 708 is in contact with a terminal edge of abrasive elements 704, 706. Handle 710 is shown as a planar extension of body 702. However, it should be appreciated that embodiments of handle 710 include one or multiple extensions of body 702 that allow a user to easily hold and manipulate burr removal tool 700.

Figure 8:
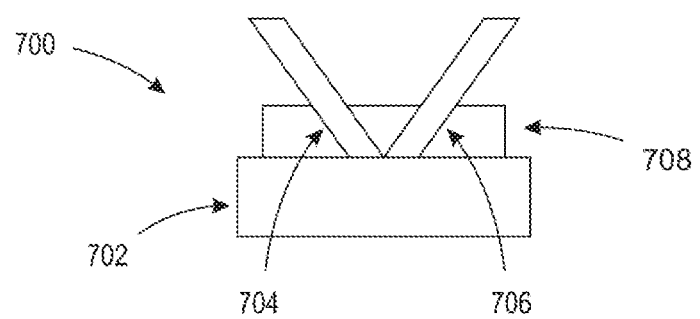
FIG. 8 is a front view of an exemplary deburring device suitable for use in practicing exemplary embodiments of this disclosure.
Figure 9:
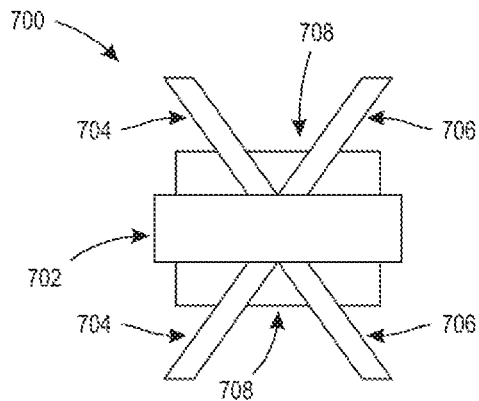
FIG. 9 is a front view of an alternative embodiment of an exemplary deburring device suitable for use in practicing exemplary embodiments of this disclosure.
Figure 10:
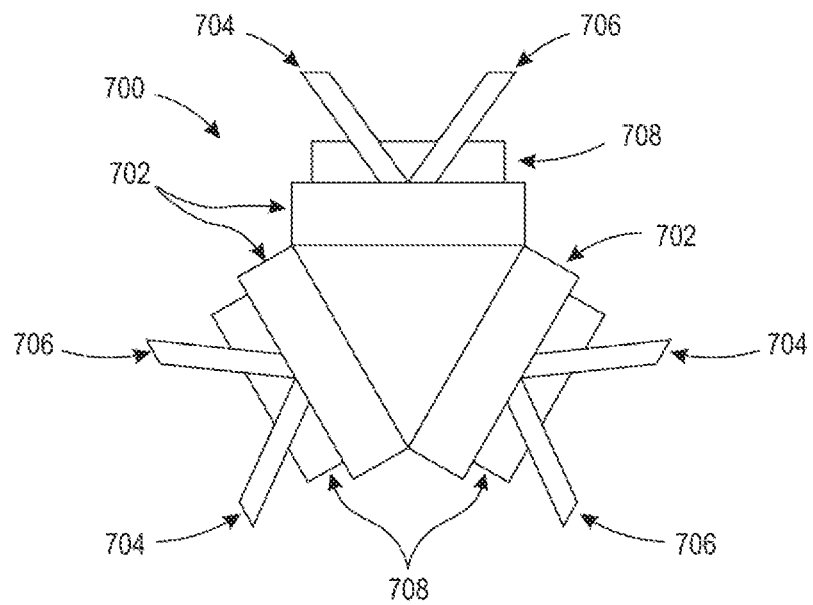
FIG. 10 is a front view of another alternative embodiment of an exemplary deburring device suitable for use in practicing exemplary embodiments of this disclosure.

Alternative embodiments (shown in FIGS. 8-10) provide for additional abrasive element configurations on one or more sides of the burr removal tool 700. As shown in FIGS. 8-10, such configurations may allow for multiple copies of the same configuration of abrasive elements 704, 706, 708 shown in FIG. 7. In the embodiments shown in FIGS. 8-10, each set of abrasive elements can provide different abrasive strengths, and/or may allow for different size/angle configurations all within the same burr removal tool.

Aspects of the instant burr removal tool has been discussed with reference to its use on machined cylindrical parts. Examples of such parts may include valve spools, bearings, engine and motor parts, piston ring grooves, wrist pins, and many others.

Figure 11:
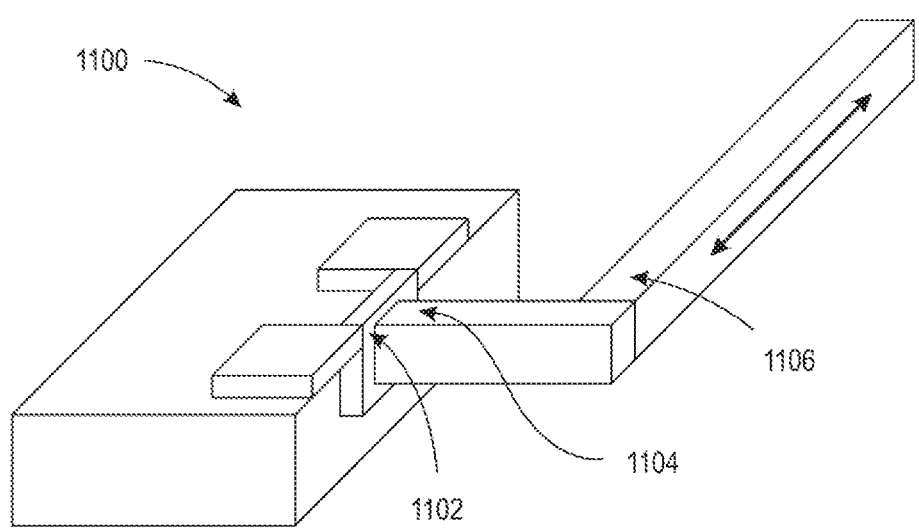
FIG. 11 is a perspective view of yet another alternative embodiment of an exemplary deburring device suitable for use in practicing exemplary embodiments of this disclosure.

While embodiments of the burr removal tool are operable with a cylindrically shaped object, embodiments also include a burr removal tool operable with other shapes. Referring to FIG. 11, shown is an exemplary burr removal tool 1100 having a first abrasive surface 1102, a second abrasive surface 1104, and a movement guide 1106. Burr removal tool 1100 is adapted to deburr a rectangular shaped object or article of manufacture. Abrasive elements 1102 and 1104 are located adjacent to and perpendicular to one another. However, it should be appreciated that embodiments of burr removal tool 1100 provide that abrasive elements 1102 and 1104 can be located at any angle in relation to one another in order to accommodate the desired edge of the object being deburred. Movement guide 1106 is operably coupled to or located adjacent to abrasive elements 1102 and 1104 providing a plane to slide the object being deburred. In this embodiment, an object is deburred by moving along movement guide 1106 in the direction of the arrows in FIG. 11 such that the edge having burrs of an object is in contact with abrasive elements 1102 and 1104.

Referring to FIG. 12, presented is a logic flow diagram in accordance with a method, apparatus, and computer-readable medium for deburring. The process begins at block 1202, which states (a) placing an item in contact with a first abrasive surface, a second surface positioned relative to the first abrasive surface, wherein the second surface is positioned between 1° and 90° relative to the first abrasive surface, and a third abrasive surface, the third abrasive surface positioned perpendicular to the first abrasive surface and the second surface along a terminal edge of the first abrasive surface and a terminal edge of the second surface; and (b) rotating the item relative to the first abrasive surface, the second surface, and the third abrasive surface, and wherein the first abrasive surface, the second surface, and the third abrasive surface are coupled to a body. Then block 1204 relates to wherein the first abrasive surface and the second surface form a "V" shape.

Following block 1204, block 1206 indicates wherein the first abrasive surface, and the third abrasive surface are operable to remove burrs from an edge of the item upon rotation of the item maintained in contact with the first abrasive surface, and the third abrasive surface. Then block 1208 states wherein the second surface is moveable relative to the first abrasive surface between 1° and 90°. Block 1210 states wherein the first abrasive surface, the second surface, and the third abrasive surface are operable to be removeably coupled to the body. Block 1212 specifies wherein a portion of the first abrasive surface comprises a slide guide and a removeable abrasive slide, the removeable abrasive slide operable to removeably attach to the first abrasive surface by the slide guide. Block 1214 states wherein a portion of the first abrasive surface comprises a slide guide and a removeable abrasive slide, the removeable abrasive slide operable to removeably attach to the first abrasive surface by the slide guide.

The logic flow diagram in FIG. 12 may be considered to illustrate the operation of a method or a result of execution of computer program instructions stored in a computer-readable medium. The logic flow diagram of FIG. 12 may also be considered a specific manner in which components of a device are configured to cause that device to operate, whether such a device is a deburring tool or some other related device, or one or more components thereof Various embodiments of the computer-readable medium include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. Various embodiments of the processor include but are not limited to general purpose computers, special purpose computers, microprocessors, digital signal processors and multi-core processors.

This disclosure has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An apparatus for deburring, the apparatus comprising:
    a body;
    a first abrasive surface coupled to the body;
    a second surface coupled to the body, the second surface positioned relative to the first abrasive surface, wherein the second surface is positioned between 1° and 90° relative to the first abrasive surface; and
    a third abrasive surface coupled to the body, the third abrasive surface positioned perpendicular to the first abrasive surface and the second surface along a terminal edge of the first abrasive surface and a terminal edge of the second surface, wherein the first abrasive surface, and the third abrasive surface are operable to remove burrs from an edge of a cylindrical item upon rotation of the cylindrical item maintained in contact with the first abrasive surface, and the third abrasive surface.

2. The apparatus according to claim 1, wherein the first abrasive surface and the second surface form a "V" shape.

3. The apparatus according to claim 1, wherein the first abrasive surface is spaced from the second surface.

4. The apparatus according to claim 1, wherein the first abrasive surface is adjacent to the second surface.

5. The apparatus according to claim 1, wherein the second surface is an abrasive surface.

6. The apparatus according to claim 1, wherein the first abrasive surface, the second surface, and the third abrasive surface are operable to be removeably coupled to the body.

7. The apparatus according to claim 1, wherein the body comprises a slide guide, and wherein the third abrasive surface is operable to be removably and slidably attached to the body within the slide guide.

8. The apparatus according to claim 1, the apparatus further comprising a fourth abrasive surface coupled to the body, and a fifth abrasive surface coupled to the body, the fifth abrasive surface positioned between 1° and 90° relative to the first abrasive surface, and wherein the third abrasive surface is positioned along a terminal edge of the fourth abrasive surface and the fifth abrasive surface.

9. The apparatus according to claim 1, wherein the body comprises a spring clip operable to removeably attach to the first abrasive surface.

10. A method of manufacture, the method comprising:
    (a) providing a body;
    (b) providing a first abrasive surface coupled to the body;
    (c) providing a second surface coupled to the body, the second surface positioned relative to the first abrasive surface, wherein the second surface is positioned between 1° and 90° relative to the first abrasive surface; and
    (d) providing a third abrasive surface coupled to the body, the third abrasive surface positioned perpendicular to the first abrasive surface and the second surface along a terminal edge of the first abrasive surface and a terminal edge of the second surface, wherein the first abrasive surface, and the third abrasive surface are operable to remove burrs from an edge of a cylindrical item upon rotation of the cylindrical item maintained in contact with the first abrasive surface, and the third abrasive surface.

11. The method according to claim 10, wherein the first abrasive surface and the second surface form a "V" shape.

12. The method according to claim 10, wherein the first abrasive surface is spaced from the second surface.

13. The method according to claim 10, wherein the first abrasive surface is adjacent to the second surface.

14. The method according to claim 10, wherein the second surface is an abrasive surface.

15. The method according to claim 10, wherein the body comprises a slide guide, and wherein the third abrasive surface is operable to be removably and slidably attached to the body within the slide guide.

16. The method according to claim 10, wherein the body comprises a spring clip operable to removeably attach to the first abrasive surface.

17. A method of deburring, the method comprising:
    (a) placing an item in contact with a first abrasive surface, a second surface positioned relative to the first abrasive surface, wherein the second surface is positioned between 1° and 90° relative to the first abrasive surface, and a third abrasive surface, the third abrasive surface positioned perpendicular to the first abrasive surface and the second surface along a terminal edge of the first abrasive surface and a terminal edge of the second surface; and
    (b) rotating the item relative to the first abrasive surface, the second surface, and the third abrasive surface, and wherein the first abrasive surface, the second surface, and the third abrasive surface are coupled to a body.

18. The method according to claim 17, wherein the first abrasive surface and the second surface form a "V" shape.

19. The method according to claim 17, wherein the first abrasive surface, and the third abrasive surface are operable to remove burrs from an edge of the item upon rotation of the item maintained in contact with the first abrasive surface, and the third abrasive surface.

20. The method according to claim 17, wherein the second surface is moveable relative to the first abrasive surface between 1° and 90°.

21. The method according to claim 17, wherein the first abrasive surface, the second surface, and the third abrasive surface are operable to be removeably coupled to the body.

22. The method according to claim 17, wherein a portion of the first abrasive surface comprises a slide guide and a removeable abrasive slide, the removeable abrasive slide operable to removeably attached to the first abrasive surface by the slide guide.

* * * * *